United States Patent
Shimomura et al.

(10) Patent No.: US 6,355,186 B1
(45) Date of Patent: Mar. 12, 2002

(54) REFRIGERATING MACHINE OIL COMPOSITION

(75) Inventors: Yuji Shimomura; Satoshi Suda, both of Yokohama; Hiroyuki Hirano, Tokyo, all of (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/632,972

(22) Filed: Aug. 4, 2000

Related U.S. Application Data

(63) Continuation-in-part of application No. 09/377,765, filed on Aug. 20, 1999, now abandoned.

(30) Foreign Application Priority Data

Jul. 5, 1999 (JP) .......................................... 11-190341

(51) Int. Cl.$^7$ ................................................. C09K 5/00
(52) U.S. Cl. ..................... 252/68; 508/465; 508/484
(58) Field of Search ................ 508/465, 484; 252/68

(56) References Cited

U.S. PATENT DOCUMENTS 5,806,336 A * 9/1998 Sunaga et al. ................. 62/469

FOREIGN PATENT DOCUMENTS

| JP | 3-128991 | 5/1991 |
|---|---|---|
| JP | 08134481 | 5/1996 |
| JP | 9-221690 | 8/1997 |
| WO | WO90/12849 | 11/1990 |
| WO | WO97/21792 | 6/1997 |
| WO | 9721792 | * 6/1997 |

OTHER PUBLICATIONS

English Abstract of Japanese Publication No. 03128991 A May 31, 1991.
English Abstract of Japanese Publication No. 9–221690 Aug. 26, 1997.
English Abstract of Japanese Publication No. 08134481 May 28, 1996.
English Abstract of Japanese Publication No. 9–221690 Aug. 26, 1997.
Japanese Search Report No. PCT/JP99/04499 dated Dec. 7, 1999.

* cited by examiner

Primary Examiner—Margaret Medley
Assistant Examiner—Cephia D. Toomer
(74) Attorney, Agent, or Firm—Finnegan, Henderson, Farabow, Garrett & Dunner, L.L.P.

(57) ABSTRACT

A refrigerating machine oil composition comprising an alicylic dicarboxylic acid ester compound having an alicyclic ring and two ester groups represented by formula (1) bonded to adjacent carbon atoms of the alicyclic ring:

$$-COOR^1 \qquad (1)$$

wherein $R^1$ represents an alkyl group having 1–18 carbon atoms, said alicyclic dicarboxylic acid ester compound being obtained by using an alcohol component comprising (a) at least one alcohol selected from a group consisting of fatty alcohols each having 1 to 5 carbon atoms; and (b) at least one alcohol selected from a group consisting of fatty alcohols each having 6 to 18 carbon atoms.

13 Claims, No Drawings

REFRIGERATING MACHINE OIL COMPOSITION

RELATED APPLICATION

The present application is a continuation-in-part application of U.S. patent application Ser. No. 09/377,765 filed on Aug. 20, 1999, now abandoned.

BACKGROUND OF THE INVENTION

1. Field of the Invention

The present invention relates to a refrigerating machine oil composition, particularly relates to a refrigerating machine oil composition characterized in containing a specific alicyclic dicarboxylic acid ester compound.

2. Related Background Art

Owing to the restriction of fluorocarbons for prevention of ozone layer destruction and prevention of global -warming, efforts are being made to replace chlorine-containing refrigerants such as CFC (chlorofluorocarbon) and HCFC (hydrochlorofluorocarbon) with HFC (hydrofluorocarbon), and to realize high efficiency of a refrigerating system. On the other hand, since HFC refrigerants are also the objects under the restriction for preventing global warming, the application of natural refrigerants such as carbon dioxide, ammonia, hydrocarbons have been researched.

In accordance with the efforts to substitute the above-mentioned refrigerants for the conventional refrigerants, various refrigerating machine oils have been developed. These refrigerating machine oils must satisfy a number of performance requirements including lubricity (lubricating action), refrigerant miscibility, heat stability/hydrolytic stability, electric insulating ability, low hygroscopicity and the like. Therefore, the compounds contained in the refrigerating machine oils are selected to meet the required performances on the basis of the type and the use of the refrigerants. For example, refrigerating machine oils for HFC refrigerants may contain oxygen compounds such as esters, ethers and carbonates that are miscible with the refrigerant, or they may contain alkylbenzene having inferior miscibility with the refrigerant but having excellent lubricity, heat stability and hydrolytic stability.

In order to achieve a high efficiency of a refrigerating system, the efforts have been made to lower the viscosity of the refrigerating machine oil. The ester refrigerating machine oils, such as polyol ester obtained from the reaction between an aliphatic polyhydric alcohol and a fatty acid, are disclosed in Japanese Translation Publication No. Hei 3-505602 (JP-A 3-505602) of International Publication for Patent Application and Japanese Patent Kokai (Laid-Open) Publication No. Hei. 3-128991 (JP-A 3-128991). One effective means for lowering viscosity of such kinds of ester refrigerating machine oils is to select a fatty acid having a small number of carbon atoms in its alkyl group. However, in general, an ester obtained from a fatty acid with a small alkyl group would have low heat stability and hydrolytic stability.

Japanese Patent Kokai (Laid-Open) Publication No. Hei 9-221690 (JP-A 9-221690) discloses an alicyclic polycarboxylic acid ester which is an ester refrigerating machine oil having excellent heat stability and hydrolytic stability. However, problems still exist. The miscibility with a refrigerant is insufficient when the number of carbon atoms of the terminal alkyl group on the ester site is large. On the other hand, the heat stability/hydrolytic stability of the refrigerating machine oil is inferior and the lubricity is insufficient when the number of carbon atoms of the terminal alkyl group on the ester site is small.

Therefore, an ester refrigerating machine oil that has all of low viscosity (for obtaining a high efficiency), high lubricity, high heat stability/hydrolytic stability and high refrigerant miscibility, and can also satisfy other required performances has not be developed yet.

SUMMARY OF THE INVENTION

The present invention has been accomplished to solve the above-mentioned technical problems. Therefore, an object of the present invention is to provide a refrigerating machine oil composition having excellent lubricity, refrigerant miscibility, heat stability/hydrolytic stability, electric insulating ability and other performances, and can achieve a high efficiency of a refrigerating system when it is used together with an HFC refrigerant or a natural refrigerant such as carbon dioxide and hydrocarbon.

As the results of intensive researches conducted by the present inventors to achieve the above described object, it is found that an excellent refrigerating machine oil composition having the above-mentioned various excellent performances can be obtained by using a base oil comprising a specific ester oil.

The refrigerating machine oil composition according to the present invention comprises an alicylic dicarboxylic acid ester compound having an alicyclic ring and two ester groups represented by formula (1) bonded to adjacent carbon atoms of the alicyclic ring:

$$—COOR^1 \tag{1}$$

wherein $R^1$ represents an alkyl group having 1–18 carbon atoms. This alicyclic dicarboxylic acid ester compound is obtained by using an alcohol component comprising:

(a) at least one alcohol selected from a group consisting of fatty alcohols each having 1 to 5 carbon atoms; and (b) at least one alcohol selected from a group consisting of fatty alcohols each having 6 to 18 carbon atoms.

The fatty alcohol in foregoing (a) is preferably:

(i) at least one alcohol selected from a group consisting of n-butanol and n-pentanol; or (ii) at least one alcohol selected from a group consisting of iso-butanol and iso-pentanol.

Further, the fatty alcohol in the foregoing (b) is at least one alcohol selected from a group consisting of fatty alcohols preferably having 6 to 12 carbon atoms and more preferably having 7 to 9 carbon atoms.

Furthermore, the ratio (mole ratio) between the fatty alcohol (a) and fatty alcohol (b) employed as the alcohol component is preferably 1:99 to 99:1.

The refrigerating machine oil composition according to the present invention further preferably comprises an epoxy compound and/or a phosphorus compound. The epoxy compound is preferably at least one compound selected from a group consisting of phenylglycidyl ether epoxy compounds, glycidyl ester epoxy compounds, alicyclic epoxy compounds and epoxidized aliphatic acid monoesters, among which glycidyl ester epoxy compounds and/or alicyclic epoxy compounds are more preferable.

A fluid composition for refrigerating machines according to the present invention comprises the above-described refrigerating machine oil composition according to the present invention and a chlorine-free fluorocarbon.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFFERRED EMBODIMENTS

The best modes for carrying out the present invention. will be explained in detail hereinafter.

The alicylic dicarboxylic acid ester compound according to the present invention has an alicyclic ring and two ester groups represented by formula (1) bonded to adjacent carbon atoms of the alicyclic ring:

—COOR$^1$         (1)

wherein R$^1$ represents an alkyl group having 1–18 carbon atoms.

This alicyclic dicarboxylic acid ester compound is obtained by using an alcohol component comprising:
 (a) at least one alcohol selected from a group consisting of fatty alcohols each having 1 to 5 carbon atoms; and
 (b) at least one alcohol selected from a group consisting of fatty alcohols each having 6 to 18 carbon atoms.

Here, the examples of the alicyclic ring include cyclopentane ring, cyclopentene ring, cyclohexane ring, cyclohexene ring, cycloheptane ring, cycloheptene ring, etc., among which cyclohexane ring and cyclohexene ring are preferable. Further, cyclohexane ring is preferable since the rise of its viscosity is small in the use for a long term or under severe conditions, whereas cyclohexene ring is preferable since the rise of its total acid value is small in the use for a long term or under severe conditions.

In addition to the alicyclic ring, the alicyclic dicarboxylic acid ester compound must have two ester groups represented by formula (1). The carboxylic acid ester compound only having one ester group is not preferable since its miscibility with the refrigerant and heat stability/hydrolytic stability are insufficient. On the other hand, the compound having 3 or more ester groups is not preferable from the viewpoint of low temperature fluidity.

Further, the two ester groups represented by formula (1) must be bonded to adjacent carbon atoms of the alicyclic ring. The dicarboxylic acid ester compound, wherein the ester groups are not bonded to adjacent carbon atoms of the alicyclic ring, is not preferable since its heat stability/hydrolytic stability and its lubricity are insufficient.

The orientation of the two adjacent ester groups represented by formula (1) may be in single cis-form, single trans-form or mixed cis- and trans-forms. However, when consideration is given to heat stability and hydrolytic stability, cis-form is preferable, whereas when consideration is given to both heat stability/hydrolytic stability and lubricity, trans-form is preferable.

Among R$^1$ in formula (1), the alkyl group deriving from the foregoing fatty alcohol (a) is an alkyl group having 1 to 5 carbon atoms. When consideration is given to the heat stability/hydrolytic stability, this alkyl group preferably has 3 to 5 carbon atoms. The alkyl group having 1–5 carbon atoms may be straight or branched chain alkyl groups. Straight chain alkyl groups are preferable when consideration is given to the lubricity, whereas branched chain alkyl groups are preferable when consideration is given to the refrigerant miscibility and heat stability hydrolytic stability.

The concrete examples of the alkyl groups having 1 to 5 carbon atoms include methyl group, ethyl group, straight or branched chain propyl group, straight or branched chain butyl group and straight or branched chain pentyl group, among which n-butyl group and n-pentyl group are preferable from the viewpoint of the lubricity; whereas iso-butyl group and iso-pentyl group are preferable from the viewpoint of heat stability/hydrolytic stability.

Among R$^1$ in formula (1), the alkyl group deriving from the foregoing fatty alcohol (b) is an alkyl group having 6 to 18 carbon atoms. When consideration is given to the refrigerant miscibility, this alkyl group has preferably 6 to 12, more preferably 7 to 9 carbon atoms. The alkyl group having 6–18 carbon atoms may be straight or branched chain alkyl groups. Straight chain alkyl groups are preferable when consideration is given to the lubricity, whereas branched chain alkyl groups are preferable when consideration is given to the refrigerant miscibility and heat stability/hydrolytic stability. Further, the alkyl groups having more than 18 carbon atoms are not preferably since the refrigeration miscibility and the low temperature fluidity are inferior.

The example of the alkyl groups including 6 to 18 carbon atoms include straight or branched chain hexyl group, straight or branched chain heptyl group, straight or branched chain octyl group, straight or branched chain nonyl group, straight or branched chain decyl group, straight or branched chain undecyl group, straight or branched chain dodecyl group, straight or branched chain tridecyl group, straight or branched chain tetradecyl group, straight or branched chain pentadecyl group, straight or branched chain hexadecyl group, straight or branched chain heptadecyl group, straight or branched chain octadecyl group, etc, among which n-heptyl group, n-octyl group, n-nonyl group and n-decyl group are preferable when consideration is given to both lubricity and miscibility, wherein iso-heptyl group, 2-ethylhexyl group and 3,5,5-trimethylhexyl group are preferable when consideration is given to both miscibility and heat stability/hydrolytic stability.

The alicyclic dicarboxylic acid ester compound according to the present invention is prepared by using the foregoing alcohol (a) and alcohol (b). The alicyclic dicarboxylic acid ester compound can be:
 (A) an ester having two ester groups represented by formula (1) in a molecule, wherein one ester group derives from the alcohol (a) and the other ester group derives from the alcohol (b);
 (B) a mixture of an ester having two ester groups represented by formula (1) in a molecule wherein both the ester groups derive from alcohol (a) and an ester having two ester groups represented by formula (1) in a molecule wherein both the ester groups derive from the alcohol (b); or
 (C) a mixture of (A) and (B).

Any one of the foregoing (A), (B) and (C) can be used as the alicyclic dicarboxylic acid ester compound according to the present invention, whereas (A) or (C) is preferable when taking into consideration the heat stability/hydrolytic stability.

When (C) is used in the present invention, the ratio of (A) to (B) is not particularly limited, whereas from the viewpoint of heat stability/hydrolytic stability, the content of (A) is preferably not less than 5% by mass, more preferably not less than 10% by mass, furthermore preferably not less than 15% by mass, and particularly preferably not less than 20% by mass, of the total amount of (A) and (B).

While the alicyclic dicarboxylic acid ester compound according to the present invention is obtained by use of two or more kinds of alcohols, one obtained by using only one kind of alcohol is unfavorable in that it cannot simultaneously satisfy all the performances of heat stability/hydrolytic stability, lubricity, and refrigerant miscibility. For example, if one kind of alcohol in the above-mentioned (a) is used alone, then the resulting compound is unfavorable in that not only its heat stability/hydrolytic stability is inferior but also its lubricity becomes insufficient. If one kind of alcohol in the above-mentioned (b) is used alone, on the other hand, then the resulting compound is unfavorable in that its refrigerant miscibility becomes insufficient.

Further, while the alicyclic dicarboxylic acid ester compound according to the present invention is obtained by use of two or more kinds of alcohols, it is particularly important that both of the alcohol in the above-mentioned (a) and the alcohol in the above-mentioned (b) be used. If two or more kinds of alcohols (a) are used alone, then the resulting compound is unfavorable in that not only its heat stability/hydrolytic stability is inferior but also its lubricity becomes insufficient. If two or more kinds of alcohols (b) are used alone, on the other hand, then the resulting compound is unfavorable in that its refrigerant miscibility becomes insufficient.

In the alicyclic dicarboxylic acid ester compound according to the present invention, the ratio (mole ratio) of $R^1$ deriving from the alcohol (a) to $R^1$ deriving from the alcohol (b) is not particularly limited. However, in order to simultaneously attain all the required performances including lubricity, heat stability/hydrolytic stability and refrigerant miscibility, the ratio is preferably with a range of 1:99 to 99:1.

Further, when the miscibility is emphasized, the above-mentioned ratio is preferably within a range of 60:40 to 99:1, more preferably within a range of 70:30 to 99:1, and the most preferably within a range of 80:20 to 99:1. On the other hand, when the heat stability/hydrolytic stability and lubricity are emphasized, the foregoing ratio is preferably within a range of 1:99 to 60:40, more preferably within a range of 1:99 to 50:50, and the most preferably within a range of 1:99 to 40:60.

Further, it is natural that the alicyclic dicarboxylic acid ester compound may have one or more hydrocarbon groups bonded to carbon atoms of its alicyclic ring. The hydrocarbon groups are preferably alkyl groups, and particularly preferably methyl group when consideration is given to its miscibility with a refrigerant.

The alicyclic dicarboxylic acid ester compound according to the present invention having the above-described structure is prepared by employing a conventional method to esterifying predetermined acid and alcohol components preferably in the atmosphere of an inert gas such as nitrogen, or in the atmosphere of an esterification catalyst, or by heating the reactants without using a catalyst.

The acid component for the alicyclic dicarboxylic acid ester compound may be a cycloalkane dicarboxylic acid, a cycloalkene dicarboxylic acid, or an acid anhydride thereof that can form an ester compound having two ester groups bonded to the adjacent carbon atoms of the alicyclic ring. These acid components can be used singly or jointly as a mixture including two or more of said acids. For example, 1,2-cyclohexanedicarboxylic acid, 4-cyclohexene-1,2-dicarboxylic acid, 1-cyclohexene-1,2-dicarboxylic acid, 3-methyl-1,2-cyclohexanedicarboxylic acid, 4-methyl-1,2-cyclohexanedicarboxylic acid, 3-methyl4-cyclohexene-1,2-dicarboxylic acid, 4-methyl-4-cyclohexene-1,2-dicarboxylic acid and acid anhydrides thereof are disclosed. Among these acids, 1,2-cyclohexanedicarboxylic acid, 3-methyl-1,2-cyclohexanedicarboxylic acid, 4-methyl-1,2-cyclohexanedicarboxylic acid and the acid anhydrides thereof are preferable from the viewpoint of restraining the rise of viscosity when the ester compounds prepared from these acids are used for a long term or under severe conditions, and 1,2-cyclohexanedicarboxylic acid is more preferable due to the excellent miscibility. On the other hand, 4-cyclohexene-1,2-dicarboxylic acid, 1-cyclohexene-1,2-dicarboxylic acid, 4-methyl-1,2-cyclohexanedicarboxylic acid, 3-methyl-4-cyclohexene-1,2-dicarboxylic acid, 4-methyl-4-cyclohexene-1,2-dicarboxylic acid and the acid anhydrides thereof are preferable from the viewpoint of restraining the rise of total acid value in the use for a long term or under severe conditions, and 4-cyclohexene-1,2-dicarboxylic acid is more preferable due to the excellent miscibility and the excellent heat stability/hydrolytic stability.

There is no particular limit to the method for preparing the alicyclic dicarboxylic acids and the acid anhydrides thereof, and the acids or the acid anhydrides obtained by any method can be used. For example, 4-cyclohexene-1,2-dicarboxylic acid can be obtained from the reaction between butadiene and maleic acid anhydride in a benzene solvent at 100° C.

In the alcohol component for the alicyclic dicarboxylic acid ester compound according to the present invention, the foregoing alcohol (a) is a straight chain alcohol having 1 to 5 carbon atoms or a branched chain alcohol having 3 to 5 carbon atoms, for example, methanol, ethanol, n-propanol, n-butanol, n-pentanol, iso-propanol, iso-butanol, sec-butanol, iso-pentanol, etc. Among these alcohols, n-butanol and n-pentanol are preferable from the viewpoint of the lubricity, whereas iso-butanol and iso-pentanol are preferable from the viewpoint of heat stability/hydrolytic stability.

Further, the foregoing alcohol (b) is a straight chain alcohol having 6 to 18 carbon atoms or a branched chain alcohol having 6 to 18 carbon atoms, for example, n-hexanol, n-heptanol, n-octanol, n-nonanol, n-decanol, n-undecanol, n-dodecanol, n-tetradecanol, n-hexadecanol, n-octadecanol, iso-hexanol, 2-methyl hexanol, 1-methyl heptanol, 2-methyl heptanol, iso-heptanol, 2-ethyl hexanol, 2-octanol, iso-octanol, 3,5,5-trimethyl hexanol, iso-decanol, iso-tetradecanol, iso-hexadecanol, iso-octadecanol, 2,6-dimethyl-4-heptanol, etc., among which n-heptanol, n-octanol, n-nonanol and n-decanol are preferable from the viewpoints of lubricity and miscibility, whereas iso-heptanol, 2-ethyl hexanol and 3,5,5-trimethyl hexanol are preferable from the viewpoints of miscibility and heat stability/hydrolytic stability.

The sum amount of the alcohol (a) and alcohol (b) components in the esterification is, for example, 1.0 to 1.5 equivalencies, preferably 1.05 to 1.2 equivalencies with respect to 1 equivalency of the acid component.

Further, the alicyclic dicarboxylic acid ester compound according to the present invention can also be obtained by transesterification using lower alcohol esters of the above-mentioned acids and/or acetic esters or propionic acid esters of corresponding alcohols instead of the above-mentioned acid and alcohol components.

The examples of the esterification catalysts include Lewis acids (e.g., aluminum derivatives, tin derivatives, titanium derivatives, etc.); alkali metal salts (e.g., sodium alkoxides, potassium alkoxides, etc.); and sulfonic acids (e.g., para-toluenesulfonic acid, methanesulfonic acid, sulfuric acid, etc.). The amount of the catalyst to be used is, for example, about 0.1 to 1% by mass of the total amount of the raw materials including the acid and alcohol components. When taking into consideration the effect of the catalyst to the heat stability/hydrolytic stability of the alicyclic dicarboxylic acid ester compound obtained from the esterification, Lewis acids such as aluminum derivatives, tin derivatives, titanium derivatives and the like are preferable, and tin derivatives are particularly preferable from the viewpoint of reaction efficiency.

The temperature for esterification is, for example, 150° C. to 230° C., and the time for completing the reaction is generally 3 to 30 hours.

After the esterification, the excessive raw materials are removed by vacuum distillation or atmospheric distillation. Subsequently, the ester compound is refined with a conventional refining method such as liquid-liquid extraction, vacuum distillation, or adsorption refining methods such as activated carbon treatment.

There is no particular restriction on the content of the alicyclic dicarboxylic acid ester compound in the refrigerating machine oil composition according to the present invention. However, in order to make the alicyclic dicarboxylic acid ester compound exhibit its various performances, the content thereof is preferably 5% by mass or more, more preferably 10% by mass or more, furthermore preferably 30% by mass or more, and the most preferably 50% by mass or more, of the total amount of the refrigerating machine oil composition.

The alicyclic dicarboxylic acid ester compound in the refrigerating machine oil composition according to the present invention is principally used as a base oil. As the base oil of the refrigerating machine oil composition according to the present invention, the alicyclic dicarboxylic acid ester compound may be used singly or in combination with an oxygen-containing synthetic oil such as esters (for example, polyol esters, complex esters, etc.) other than the alicylic dicarboxylic acid esters specified in the present invention, polyglycols, polyvinyl ethers, ketones, polyphenyl ethers, silicone, polysiloxanes, or perfluoro ethers.

There is no particular restriction on the amount of the oxygen-containing synthetic oil to be incorporated into the refrigerating machine oil composition. However, in order to improve thermal efficiency and attain heat stability/hydrolytic stability of the refrigerating machine oil, the content of the oxygen-containing synthetic oil is preferably not more than 150 parts by weight and more preferably not more than 100 parts by weight with respect to 100 parts by weight of the alicyclic dicarboxylic acid ester compound.

The refrigerating machine oil composition according to the present invention comprising the alicyclic dicarboxylic acid ester compound and, if required, the oxygen-containing synthetic oil is principally used as a base oil. The refrigerating machine oil composition according to the present invention can be suitably used without any other additives, or, if required, used with various additives incorporated therein.

In order to further improve the wear resistance and load capacity of the refrigerating machine oil composition according to the present invention, at least one phosphorus compound selected from a group consisting of phosphoric esters, acidic phosphoric esters, amine salts of acidic phosphoric esters, chlorinated phosphoric esters and phosphorous esters can be incorporated into the refrigerating machine oil composition according to the present invention. These phosphorus compounds are esters of phosphoric acid or phosphorous acid and an alkanol or a polyether type alcohol; or are derivatives thereof.

Specifically, the phosphoric esters include, for example, tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylyl phosphate, cresyl diphenyl phosphate, xylyl diphenyl phosphate and the like. The acidic phosphoric esters include, for example, monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate, dioleyl acid phosphate and the like. The amine salts of acidic phosphoric esters include, for example, salts of the above acidic phosphoric esters and amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine and trioctylamine. The chlorinated phosphoric esters include, for example, tris dichloropropyl phosphate, tris chloroethyl phosphate, tris chlorophenyl phosphate, polyoxyalkylenebis[di(chloroalkyl)] phosphate and the like. The phosphorous esters include, for example, dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenylphosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite,triphenylphosphite,tricresyl phosphite and the like. The mixtures of the above compounds can be used.

In a case where these phosphorus compounds are incorporated into the refrigerating machine oil composition according to the present invention, the amount of the phosphorus compounds to be incorporated is not particularly limited, whereas in general the content of the incorporated phosphorus compounds is preferably within a range of 0.01 to 5.0% by mass and more preferably within a range of 0.02 to 3.0% by mass, of the total amount of the refrigerating machine oil composition (i.e., the total amount of the base oil and all incorporated additives).

Further, in order to further improve the heat stability and hydrolytic stability, the refrigerating machine oil composition according to the present invention may further comprise at least one epoxy compound selected from a group consisting of:

(1) phenylglycidyl ether epoxy compounds,
(2) alkylglycidyl ether epoxy compounds,
(3) glycidyl ester epoxy compounds,
(4) aryl oxirane compounds, (5) alkyl oxirane compounds,
(6) alicyclic epoxy compounds,
(7) epoxidized fatty acid monoesters, and
(8) epoxidized vegetable oils.

(1) Phenylglycidyl ether epoxy compounds can concretely exemplified by phenylglycidyl ether or alkylphenylglycidyl ethers. The alkylphenylglycidyl ethers mentioned here include, for example, those having 1 to 3 alkyl groups each having 1 to 13 carbon atoms, among which those having one alkyl group with 4 to 10 carbon atoms, for example, n-butylphenylglycidyl ether, i-butylphenylglycidyl ether, sec-butylphenylglycidyl ether, tert-butylphenylglycidyl ether, pentylphenylglycidyl ether, hexylphenylglycidyl ether, heptylphenylglycidyl ether, octylphenylglycidyl ether, nonylphenylglycidyl ether, decylphenylglycidyl ether and the like are preferable.

(2) Alkylglycidyl ether epoxy compounds can be concretely exemplified by decylglycidyl ether, undecylglycidyl ether, dodecylglycidyl ether, tridecylglycidyl ether, tetradecylglycidyl ether, 2-ethylhexylglycidyl ether, neopentylglycoldiglycidyl ether, trimethylolpropanetriglycidyl ether, pentaerythritoltetraglycidyl ether, 1,6-hexanedioldiglycidyl ether, sorbitolpolyglycidyl ether, polyalkyleneglycolmonoglycidyl ether, polyalkyleneglycoldiglycidyl ether and the like.

(3) Glycidyl ester epoxy compounds can be concretely exemplified by the compounds represented by formula (2):

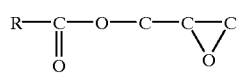
(2)

wherein R is a hydrocarbon group having 1 to 18 carbon atoms.

In formula (2), the hydrocarbon group having 1–18 carbon atoms represented by R is, for example, an alkyl group having 1–18 carbon atoms; an alkenyl group having 2–18 carbon atoms; a cycloalkyl group having 5–7 carbon atoms; an alkylcycloalkyl group having 6–18 carbon atoms; an aryl group having 6–10 carbon atoms; an alkylaryl group having 7–18 carbon atoms; and an arylalkyl group having 7–18 carbon atoms, among which an alkyl group having 5–15 carbon atoms; an alkenyl group having 2–15 carbon atoms; a phenyl group; and an alkylphenyl group having an alkyl group having 1–4 carbon atoms are preferable.

The preferable examples of glycidyl ester epoxy compounds include glycidyl-2,2-dimethyloctanoate, glycidyl benzoate, glycidyl-tert-butyl benzoate, glycidyl acrylate, glycidyl methacrylate and the like.

(4) Aryl oxirane compounds can be concretely exemplified by 1,2-epoxy styrene, alkyl-1,2-epoxy styrene.

(5) Alkyl oxirane compounds can be concretely exemplified by 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, 1,2-epoxyicosane and the like.

(6) Alicyclic epoxy compounds are represented by formula (3) wherein the carbon atoms forming an epoxy group directly constitute an alicyclic ring:

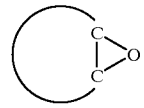
(3)

Alicyclic epoxy compounds can be concretely exemplified by 1,2-epoxycyclohexane, 1,2-epoxycyclopentane, 3,4-epoxycyclohexylmethyl-3,4-epoxycyclohexanecarboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0])heptane, 4-(1'-methylepoxyethyl)-1,2-epoxy-2-methylcyclohexane, 4-epoxyethyl-1,2-epoxycyclohexane and the like.

(7) Epoxidized fatty acid monoesters can be concretely exemplified by the esters of an epoxidized fatty acid having 12 to 20 carbon atoms and a phenol, an alkylphenol or an alcohol having 1 to 8 carbon atoms. In particular, butyl, hexyl, benzyl, cyclohexyl, methoxyethyl, octyl, phenyl and butylphenyl esters of epoxidized stearic acid are preferably used.

(8) Epoxidized vegetable oil can be concretely exemplified by the epoxy compounds of vegetable oils such as soybean oil, linseed oil, cotton seed oil and the like.

In order to further improving heat stability and hydrolytic stability, the preferable ones among the above-listed epoxy compounds are phenylglycidyl ether epoxy compounds, glycidyl ester epoxy compounds, alicyclic epoxy compounds and epoxidized fatty acid monoesters, among glycidyl ester epoxy compounds and alicyclic epoxy compounds are more preferable.

When these epoxy compounds are incorporated into the refrigerating machine oil composition according to the present invention, the amount of the epoxy compounds to be incorporated is not particularly limited, whereas in general the content of the incorporated epoxy compounds is preferably within a range of 0.1 to 5.0% by mass and more preferably within a range of 0.2 to 2.0% by mass, of the total amount of the refrigerating machine oil composition (i.e., the total amount of the base oil and all incorporated additives).

As a matter of course, two or more kinds of above described phosphorus compounds and epoxy compounds may be used jointly.

In order to further improve the wear resistance and load capacity, a sulfur-containing additive can be incorporated into the refrigerating machine oil composition according to the present invention. The example of such a sulfur additive include phosphorothionates, sulfides, thiocarbonates and zinc thiophosphates.

Phosphorothionates are represented by formula (4)

$$(R^2O)_3P=S \qquad (4)$$

wherein each $R^2$ represents an alkyl group, an aryl group or a phenyl group, $R^2$ may be the same or different from each other. Such phosphorothionates include, for example, trialkylphosphorothionates, triphenylphosphorothionate, alkyldiarylphosphorothionates, etc.

Sulfides include, for example, diphenylsulfide, diphenyldisulfide, di-n-butylsulfide; di-n-butyldisulfide, di-tert-dodecyldisulfide, di-tert-dodecyl trisulfide and the like. Thiocarbonates include, for example, xanthic disulfide. Zinc thiophosphates include, for example, zinc primary alkylthiophosphate, zinc secondary alkylthiophospahte, zinc arylthiophosphate and the like.

Among the above-mentioned sulfur additive, phosphorothionates are preferable from the viewpoints of wear resistance, load capacity and heat stability/hydrolytic stability, and among the phosphorothionates, triphenylphosphorothionate is particularly preferable.

When the sulfur additive is incorporated into the refrigerating machine oil composition according to the present invention, the amount of the sulfur additive to be incorporated is not particularly limited, whereas, when the consideration is given to wear resistance and load capacity, the amount of the sulfur additive is preferably not less than 0.1% by mass, more preferably not less than 0.5% by mass, and further more preferable not less than 1.0% by mass, of the total amount of the refrigerating machine oil composition (i.e., the total amount of the base oil and all incorporated additives). Further, when the consideration is given to the heat stability/hydrolytic stability, the amount of sulfur additive to be incorporated is preferably not more than 50% by mass, more preferably not more than 30% by mass, and further more preferable not more than 10% by mass.

Further, in order to improve the performances, the refrigerating machine oil composition according to the present invention may be incorporated, as required, with heretofore known additives for a refrigerating machine oil, for example, phenol-type antioxidants such as di-tert-butyl-p-cresol and bisphenol A; amine-type antioxidants such as phenyl-α-naphthylamine and N,N-di(2-naphthyl)-p-phenylenediamine; extreme pressure agents such aschlorinat.edparaffin; oiliness improvers such as fattyacids; antifoaming agents such as silicone-type ones; metal inactivators such as benzotriazole; viscosity index improvers; pour-point depressants; detergent dispersants and soon. These additives may be incorporated into the refrigerating machine oil singly or jointly. The total amount of the additives added into the refrigerating machine oil is not particularly limited, whereas in general the content thereof is preferably not more than 10% by mass and more preferably not more than 5% by mass, of the total amount of the refrigerating machine oil composition(i.e., the total amount of the base oil and all incorporated additives).

The kinematic viscosity of the refrigerating machine oil of the present invention is not particularly limited, whereas the kinematic viscosity at 40° C. can preferably be within a range of 3 to 100 mm$^2$/s, more preferably 4 to 50 mm$^2$/s and the most preferably 5 to 40 mm$^2$/s. Further, the kinematic viscosity at 100° C. can preferably be within a range of 1 to 20 mm$^2$/s and more preferably 2 to 10 mm$^2$/s. Further, one of the effects achieved by the present invention is that good heat stability/hydrolysis resistance can be obtained even when an ester having a low viscosity is used. Such effect is more remarkably achieved in the case where the kinematic viscosity at 40° C. is preferably within a range of 5 to 35 mm$^2$/s, more preferably 5 to 25 mm$^2$/s, furthermore preferably 5 to 20 mm$^2$/s, and the most preferably 5 to 15 mm$^2$/s.

Further, the volume resistivity of the refrigerating machine oil composition according to the present invention is not particularly limited, whereas it can preferably be not less than $1.0 \times 10^{11}$ Ω·cm, more preferably not less than $1.0 \times 10^{12}$ Ω·cm and the most preferably not less than $1.0 \times 10^{13}$ Ω·cm. Particularly, when the refrigerating machine oil composition is used for a hermetic type refrigerating machine, high electric insulating ability tends to become requisite. In the present invention, the volume resistivity is represented by the value at 25° C. measured in accordance with JIS C 2101 "Electric Insulating Oil Testing Method."

The content of water in the refrigerating machine oil composition according to the present invention is not particularly limited, whereas it can preferably be 200 ppm or less, more preferably 100 ppm or less, and the most preferably 50 ppm or less, of the total amount of the refrigerating machine oil composition. Particularly, when the refrigerating machine oil composition is used for a hermetic type refrigerating machine, a low water content is required due to its effects on the heat stability/hydrolytic stability and electric insulating ability of the oil.

Further, the total acid value of the refrigerating machine oil composition according to the present invention is not particularly limited. However, when the oil composition is used in a refrigerating machine or pipes for preventing metals from corrosion, the total acid value can preferably be 0.1 mgKOH/g or less, and more preferably 0.05 mgKOH/g or less. In the present invention, the total acid value is represented by the value of the total acid value measured in accordance with JIS C 2501 "Petroleum Products and Lubricating Oils-Neutralization Value Testing Method".

The content of ash in the refrigerating machine oil composition according to the present invention is not particularly limited, whereas, in order to improve the heat stability/hydrolytic stability of the oil and suppress the generation of sludge or the like, it can preferably be 100 ppm or less, and more preferably 50 ppm or less. In the present invention, the ash content is represented by the value of the ash content measured in accordance with JIS C 2272 "Testing Method for Ash Content and Sulfuric Acid Ash Content in Crude Oil and Petroleum Product".

The refrigerants to be used in the refrigerating machine wherein the refrigerating machine oil composition according to the present invention is used may be HFC refrigerants, fluorine-containing ether refrigerants such as perfluoroethers; fluorine-free ether refrigerants such as dimethyl ethers; and natural refrigerants such as carbon dioxide, hydrocarbons and so on. The refrigerants can be used singly or jointly as a mixture including two or more kinds of the refrigerants.

HFC refrigerants are, for example, hydrofluocarbons having 1–3 and preferably 1 or 2-carbon atoms, for example, difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), 1,1-difluoroethane (HFC-152a) or a mixture of two or more kinds of these HFCs. The refrigerant is selected in accordance with the use and the requisite performances. For example, single HFC-32; single HFC-23; single HFC-134a; single HFC-125, a mixture of HFC-134a/HFC-32=60–80% by mass/40–20% by mass; a mixture of HFC-32/HFC-125=40–70% by mass/60–30% by mass; a mixture of HFC-125/HFC-143a =40–60% by mass/60–40% by mass; a mixture of HFC-134a/HFC-32/HFC-125=60% by mass/30% by mass/10% by mass; a mixture of HFC-134a/HFC-32/HFC-125=40–70% by mass/15–35% by mass/5–40% by mass; and a mixture of HFC-125/HFC-134a/HFC-143a=35–55% by mass/1–15% by mass/40–60% by mass are preferable. More specific examples include a mixture of HFC-134a/HFC-32=70/30% by mass, a mixture of HFC-32/HFC-125=60/40% by mass; a mixture of HFC-32/HFC-125=50/50% by mass (R410A); a mixture of HFC-32/HFC-125=45/55% by mass (R410B); a mixture of HFC-125/HFC-143a=50/50% by mass (R507C); a mixture of HFC-32/HFC-125/HFC-134a=30/10/60% by mass; a mixture of HFC-32/HFC-125/HFC-134a=23/25/52% by mass (R407C); a mixture of HFC-32/HFC-125/HFC-134a=25/15/60% by mass (R407E); and a mixture of HFC-125/HFC-134a/HFC-143a=44/4/52% by mass (R404A).

Further, the example of the natural refrigerants include carbon dioxide, hydrocarbons and so on. The hydrocarbon refrigerant used here is preferably a gas at 25° C. under 1 atm, for example, alkane, cycloalkane or alkene having 1 to 5 carbon atoms and preferably 1 to 4 carbon atoms or a mixture thereof. The examples of the hydrocarbon refrigerant include methane, ethylene, ethane, propylene, propane, cyclopropane, butane, isobutane, cyclobutane, methylcyclopropane and the mixtures of two or more kinds of these compounds, among which propane, butane, isobutane and the mixtures thereof are preferable.

The refrigerating machine oil composition according to the present invention normally exists in the form of a fluid composition for a refrigerating machine mixed with a refrigerant as describe above when it is used in the refrigerating machine. The ratio of the refrigerating machine oil composition to the refrigerant is not particularly limited, whereas the amount of the refrigerating machine oil composition is preferably within a range of 1 to 500 parts by weight and more preferably within a range of 2 to 400 parts by weight per 100 parts by weight of the refrigerant.

The refrigerating machine oil composition according to the present invention can be used as a lubricating oil for refrigerant compressors in all types of refrigerating machines, since the present refrigerating machine oil composition has excellent electric characteristic and a low hygroscopicity. Such refrigerating machines in which the present refrigerating machine oil composition is used can be concretely exemplified by an air conditioner for rooms, a package air conditioner, a cold-storage chest (refrigerator), an air conditioner for vehicles, a dehumidifier, a freezer, a freeze and refrigeration warehouse, an automatic vending machine, a showcase, a cooling apparatus in chemical plants and so on. Further, the refrigerating machine oil composition according to the present invention is particularly preferable to be used in refrigerating machines having a hermetic compressor. Furthermore, the refrigerating machine oil composition according to the present invention can be used in all types of compressors including a reciprocating type one, a rotating type one and a centrifugal type one. Furthermore, the refrigerating machine oil composition according to the present invention can be used as a lubricating oil for the purpose of bettering the initial running-in of a sliding member in a refrigerant compressor.

A typical example of refrigerating cycle in which the composition of the present invention can favorably be used is one comprising a compressor, a condenser, an expansion mechanism, an evaporator, and, if necessary, a dryer.

Examples of compressor include (1) a high-pressure vessel type compressor comprising a closed vessel stored with a refrigerating machine oil which accommodates a motor composed of a rotor and a stator, a rotating shaft fitted in the rotor, and a compressor section connected to the motor by way of the rotating shaft, whereas a high-pressure refrigerant gas discharged from the compressor section resides in the closed vessel; and (2) a low-pressure vessel type compressor comprising a closed vessel stored with a refrigerating machine oil which accommodates a motor composed of a rotor and a stator, a rotating shaft fitted in the rotor, and a compressor section connected to the motor by way of the rotating shaft, whereas a high-pressure refrigerant gas discharged from the compressor section is directly expelled to the outside of the closed vessel.

As an insulating film used as an electric insulating system material for the motor section, crystalline plastics films having a glass transition temperature of 50° C. or higher, specifically, for example, at least one kind of insulating films selected from the group consisting of polyethylene terephthalates, polybutylene terephthalates, polyphenylene sulfides, polyether ether ketones, polyethylene naphthalates, polyamide-imides, and polyimides; and composite films obtained by coating a film having a low glass transition temperature with a resin layer having a high glass transition temperature are preferably employed since they are hard to deteriorate in terms of tensile strength characteristics and electrical insulating characteristics. As a magnet wire used for the motor section, enamel coatings having a glass transition temperature of 120° C. or higher, e.g., monolayers of polyesters, polyester imides, polyamides, polyamide-imides, and the like; and composite enamel coatings obtained by forming a higher layer having a higher glass transition temperature on a lower layer having a lower glass transition temperature are preferably employed. Examples of enamel wire with composite coating include ones in which a lower layer made of polyester imide is coated with an upper layer made of polyamide-imide (AI/EI), and a lower layer made of polyester is coated with an upper layer made of polyamide-imide (AI/PE).

Preferably employed as a drying agent packed into the dryer is a synthetic zeolite composed of a composite salt consisting of alkali metal silicates and alkali metal aluminates which has a pore diameter of 3.3 angstroms or less and, at 25° C. and a carbon dioxide partial pressure of 250 mmHg, a carbon dioxide gas absorption capacity of 1.0% or less. Specific examples thereof include product names XH-9, XH-10, XH-11, and XH-600 manufactured by Union Showa K.K.

EXAMPLES

The present invention will be explained in detail by the following Examples and Comparative Examples, but the present invention is not limited to these Examples.

Examples 1–20 and Comparative Examples 1–13

The following base oils and additives were blended in the proportions shown in Tables 1–8 to prepare sample oils of Examples 1–20 and Comparative Examples 1–13, respectively. The properties of each of the obtained sample oils are shown in Tables 1–8 (kinematic viscosities at 40° C. and 100° C., total acid value).

[Base Oil]

Base Oil 1: esters obtained from 4-cyclohexene-1,2-dicarboxylic acid, n-butanol and n-heptanol(ester 1: 15% by mass; ester 5: 5% by mass; ester 7: 80% by mass).

Base Oil 2: esters obtained from 4-cyclohexene-1,2-dicarboxylic acid, i-butanol and n-heptanol(ester 2: 26% by mass; ester 6: 2% by mass; ester 7: 72% by mass).

Base Oil 3: esters obtained from 4-cyclohexene-1,2-dicarboxylic acid, n-butanol and 2-ethyl hexanol(ester 3: 13% by mass; ester 5: 6% by mass; ester 8: 81% by mass).

Base Oil 4: esters obtained from 4-cyclohexene-1,2-dicarboxylic acid, i-butanol and 2-ethyl hexanol(ester 4: 24% by mass; ester 6: 2% by mass; ester 8: 74% by mass).

Base Oil 5: esters obtained from 4-cyclohexene-1,2-dicarboxylic acid, i-butanol and2-ethyl hexanol(ester 4: 40% by mass; ester 6: 8% by mass; ester 8: 52% by mass).

Base Oil 6: a mixture of an ester obtained from 4-cyclohexene-1,2-dicarboxylic acid and i-butanol and an ester obtained from 4-cyclohexene-1,2-dicarboxylic acid and 2-ethyl hexanol(ester 6: 50% by mass; ester 8: 50% by mass).

Base Oil 7: an ester obtained from 4-cyclohexene-1,2-dicarboxylic acid and n-butanol (ester 5: 100% by mass)

Base Oil 8: an ester obtained from 4-cyclohexene-1,2-dicarboxylic acid and i-butanol (ester 6: 100% by mass).

Base Oil 9: an ester obtained from 4-cyclohexene-1,2-dicarboxylic acid and fi-heptanol (ester 7: 100% by mass).

Base Oil 10: an ester obtained from 4-cyclohexene-1,2-dicarboxylic acid and 2-ethyl hexanol (ester 8: 100% by mass).

Base Oil 11: esters obtained from 4-cyclohexene-1,2-dicarboxylic acid, i-butanol, and 3,5,5-trimethyl hexanol (ester 6: 18% by mass; ester 9: 56% by mass; ester 10: 26% by mass).

Base Oil 12: esters obtained from 4-cyclohexene-1,2-dicarboxylic acid, i-butanol, and i-nonanol(ester 6: 7% by mass; ester 1: 43% by mass; ester 12: 50% by mass).

Base Oil 13: esters obtained from 4-cyclohexene-1,2-dicarboxylic acid, n-butanol, and i-decanol(ester 5: 20% by mass; ester 13: 47% by mass; ester 14: 33% by mass).

Base Oil 14: esters obtained from 1,2-cyclohexane dicarboxylic acid, n-butanol, and n-heptanol (ester 15: 13% by mass; ester 19: 6% by mass; ester 21: 81% by mass).

Base Oil 15: esters obtained from 1,2-cyclohexane dicarboxylic acid, i-butanol, and n-heptanol (ester 16: 25% by mass; ester 20: 2% by mass; ester 21: 73% by mass).

Base Oil 16: esters obtained from 1,2-cyclohexane dicarboxylic acid, n-butanol, and 2-ethyl hexanol (ester 17: 14% by mass; ester 19: 4% by mass; ester 22: 82% by mass).

Base Oil 17: esters obtained from 1,2-cyclohexane dicarboxylic acid, i-butanol, and 2-ethyl hexanol (ester 18: 23% by mass; ester 20: 4% by mass; ester 22: 73% by mass).

Base Oil 18: esters obtained from 1,2-cyclohexane dicarboxylic acid, i-butanol, and 2-ethyl hexanol (ester 18: 38% by mass; ester 20: 12% by mass; ester 22: 50% by mass).

Base Oil 19: a mixture of an ester obtained from 1,2-cyclohexane dicarboxylic acid and i-butanol and an ester obtained from. 1,2-cyclohexane dicarboxylic acid and 2-ethyl hexanol (ester 20: 50% by mass; ester 22: 50% by mass).

Base Oil 20: an ester obtained from 1,2-cyclohexane dicarboxylic acid and n-butanol (ester 19:.100% by mass).

Base Oil 21: an ester obtained from 1,2-cyclohexane dicarboxylic acid and i-butanol (ester 20: 100% by mass).

Base Oil 22: an ester obtained from 1,2-cyclohexane dicarboxylic acid and n-heptanol (ester 21: 100% by mass).

Base Oil 23: an ester obtained from 1,2-cyclohexane dicarboxylic acid and 2-ethyl hexanol (ester 22: 100% by mass).

Base Oil 24: esters obtained from 1,2-cyclohexane dicarboxylic acid, i-butanol, and 3,5,5-trimethyl hexanol (ester 20: 18% by mass; ester 23: 56% by mass; ester 24: 26% by mass).

Base Oil 25: esters obtained from 1,2-cyclohexane dicarboxylic acid, i-butanol, and i-nonanol (ester 20: 7% by mass; ester 25: 43% by mass; ester 26: 50% by mass).

Base Oil 26: esters obtained from 1,2-cyclohexane dicarboxylic acid, n-butanol, and i-decanol (ester 19: 20% by mass; ester 27: 47% by mass; ester 28: 33% by mass).

Base Oil 27: a diester obtained from 4-cyclohexene-1,2-dicarboxylic acid and a mixture alcohol of n-tetradecanol and i-decanol (mole ratio=50:50)

Base Oil 28: a diester obtained from 1,2-cyclohexane dicarboxylic acid and a mixture alcohol of 3,5,5-trimethyl hexanol and 2-ethyl hexanol (mole ratio=50:50).

Base Oil 29: a diester obtained from 1,2-cyclohexane dicarboxylic acid and a mixture alcohol of 3,5,5-trimethyl hexanol and cyclohexanol (mole ratio=50:50).

Base Oil 30: a diester obtained from 1,2-cyclohexane dicarboxylic acid and a mixture alcohol of 3,5,5-trimethyl hexanol and 2,6-dimethyl-4-heptanol (mole ratio=50:50).

Base Oil 31: a diester obtained from 1,2-cyclohexane dicarboxylic acid and a mixture alcohol of n-nonanol and 2,6-dimethyl-4-heptanol (mole ratio=50:50).

[Cyclohexene dicarboxylic acid esters 1 to 14 in Base Oils 1 to 13]

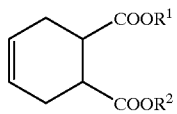

Ester 1: $R^1$: n-butyl group, $R^2$: n-heptyl group
Ester 2: $R^1$: i-butyl group, $R^2$: n-heptyl group
Ester 3: $R^1$: n-butyl group, $R^2$: 2-ethylhexyl group
Ester 4: $R^1$: i-butyl group, $R^2$: 2-ethylhexyl group
Ester 5: $R^1$: n-butyl group, $R^2$: n-butyl group
Ester 6: $R^1$: i-butyl group, $R^2$: i-butyl group
Ester 7: $R^1$: n-heptyl group, $R^2$: n-heptyl group
Ester 8: $R^1$: 2-ethylhexyl group, $R^2$: 2-ethylhexyl group
Ester 9: $R^1$: i-butyl group; $R^2$: 3,5,5-trimethylhexyl group
Ester 10: $R^1$: 3,5,5-trimethylhexyl group; $R^2$: 3,5,5-trimethylhexyl group
Ester 11: $R^1$: i-butyl group; $R^2$: i-nonyl group
Ester 12: $R^1$: i-nonyl group; $R^2$: i-nonyl group
Ester 13: $R^1$: n-butyl group; $R^2$,: i-decyl group
Ester 14: $R^1$: i-decyl group; $R^2$: i-decyl group

[Cyclohexane dicarboxylic acid esters 15 to 28 in Base Oils 14 to 26]

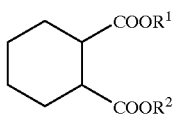

Ester 15: $R^1$: n-butyl group; $R^2$: n-heptyl group
Ester 16: $R^1$: i-butyl group; $R^2$: n-heptyl group
Ester 17: $R^1$: n-butyl group; $R^2$: 2-ethylhexyl group
Ester 18: $R^1$: i-butyl group; $R^2$: 2-ethylhexyl group
Ester 19: $R^1$: n-butyl group; $R^2$: n-butyl group
Ester 20: $R^1$: i-butyl group; R2: i-butyl group
Ester 21: $R^1$: n-heptyl group; R2: n-heptyl group
Ester 22: $R^1$: 2-ethylhexyl group; $R^2$: 2-ethylhexyl group
Ester 23: $R^1$: i-butyl group; $R^2$: 3,5,5-trimethylhexyl group
Ester 24: $R^1$: 3,5,5-trimethylhexyl group; $R^2$: 3,5,5-trimethylhexyl group
Ester 25: $R^1$: i-butyl group; $R^2$: i-nonyl group
Ester 26: $R^1$: i-nonyl group; $R^2$: i-nonyl group
Ester 27: $R^1$: n-butyl group; $R^2$: i-decyl group
Ester 28: $R^1$: i-decyl group; $R^2$: i-decyl group

[Additives]

Additive 1: glycidyl-2,2-dimethyloctanoate
Additive 2: tricresyl phosphate

Next, the following tests were carried out in respect to each of the above-described sample oils.

(Refrigerant Miscibility Test)

In accordance with "Refrigerant Miscibility Testing Method" of JIS-K-2211 "Refrigerating machine oil," 10 g of each of the sample oils was blended with 40 g of HFC 134a refrigerant to observe whether the sample oils and the refrigerant were miscible with each other at ° 10° C., or separate from each other or in the state of a white suspension.

The results are shown in Tables 1–8.

(Electric Insulating Ability Test)

The volume resistivity at 25° C. of each of the sample oils was measured in accordance with JIS-C-2101 "Electric Insulating Oil Testing Method." The results are shown in Tables 1–8.

(Heat Stability/Hydrolytic Stability Test I)

90g of each of the sample oils wherein the water content had been adjusted to 1000 ppm were weighted and sealed in an autoclave together with 10 g of HFC 134a refrigerant and catalysts (iron, copper and aluminum wires), and subsequently heated at 200° C. Two weeks later, the appearances of the sample oils and the appearance of the catalysts were observed, and the volume resistivity of the sample oils and the total acid values of the sample oils were measured. The results are shown in Tables 1–8.

(Lubricity Test)

The sample oils were each applied to a test journal for measuring the amount of the test journal (pin) worn by having the test machine run in at a test oil temperature of 100° C. under a load of 150 lb for 1 minute and then run under a load of 250 lb for 2 hours in accordance with ASTM D 2670 "FALEX WEAR TEST."

The results of the measurement are shown in Tables 1–8.

(Heat Stability/Hydrolytic Stability Test II)

In accordance with JIS-K-2540, 30 g of each of the sample oils were weighed and collected into a 50-ml beaker, which was subsequently sealed with an aluminum foil and then was left in a 150° C. thermostat equipped with a rotating plate. After the lapse of 7 days, the appearances of the sample oils, the kinematic viscosity of the sample oils at 40° C., rand the total acid values of the sample-oils were evaluated. Thus obtained results are shown in Tables 1, 4, 5, and 7.

TABLE 1

|  |  | Example 1 | Example 2 | Example 3 | Example 4 | Example 5 |
|---|---|---|---|---|---|---|
| Base Oil |  | 1 | 2 | 3 | 4 | 5 |
| (% by mass) |  | (100) | (100) | (100) | (100) | (100) |
| Additive |  | — | — | — | — | — |
| (% by mass) |  |  |  |  |  |  |
| Kinematic | 40° C. (mm$^2$/s) | 10.5 | 10.3 | 16.5 | 15.1 | 12.8 |
| Viscosity | 100° C. (mm$^2$/s) | 3.0 | 2.5 | 3.2 | 3.0 | 2.7 |
| Total Acid Value (mg KOH/g) |  | 0.00 | 0.00 | 0.00 | 0.00 | 0.00 |
| Miscibility |  | Miscible | Miscible | Miscible | Miscible | Miscible |
| Volume Resistivity (Ω · cm) |  | $1.2 \times 10^{12}$ | $1.0 \times 10^{12}$ | $1.5 \times 10^{12}$ | $3.0 \times 10^{12}$ | $1.0 \times 10^{12}$ |
| Heat Stability/ | Appearance of Sample Oil | No Change | No Change | No Change | No Change | No Change |
| Hydrolytic | Appearance  Cu | No Change | No Change | No Change | No Change | No Change |
| stability Test I | of Catalyst  Fe | No Change | No Change | No Change | No Change | No Change |
|  | Al | No Change | No Change | No Change | No Change | No Change |
|  | Volume Resistivity (Ω · cm) | $1.0 \times 10^{11}$ | $5.5 \times 10^{11}$ | $2.5 \times 10^{11}$ | $7.0 \times 10^{11}$ | $4.2 \times 10^{11}$ |
|  | Total Acid Value (mg KOH/g) | 1.25 | 0.90 | 0.35 | 0.30 | 0.32 |
| FALEX Test | Amount of Journal Worn (mg) | 17 | 18 | 22 | 21 | 24 |
| Heat Stability/ | Appearance of Sample Oil | No Change | No Change | No Change | No Change | No Change |
| Hydrolytic | Kinematic Viscosity | 15.9 | 15.4 | 25.0 | 22.5 | 18.9 |
| stability Test II | 40° C. (mm$^2$/s) |  |  |  |  |  |
|  | Total Acid Value (mg KOH/g) | 1.57 | 1.32 | 1.45 | 1.28 | 1.56 |

TABLE 2

|  |  | Example 6 | Example 7 | Example 8 |
|---|---|---|---|---|
| Base Oil |  | 6 | 4 | 4 |
| (% by mass) |  | (100) | (99.8) | (99) |
| Additive |  | — | 1 | 2 |
| (% by mass) |  | (0.2) | (1) | 2 |
| Kinematic | 40° C. (mm$^2$/s) | 13.3 | 15.1 | 15.1 |
| Viscosity | 100° C. (mm$^2$/s) | 2.8 | 3.0 | 3.0 |
| Total Acid Value (mg KOH/g) |  | 0.00 | 0.00 | 0.00 |
| Miscibility |  | Miscible | Miscible | Miscible |
| Volume Resistivity (Ω · cm) |  | $2.8 \times 10^{12}$ | $6.2 \times 10^{11}$ | $2.8 \times 10^{12}$ |
| Heat Stability/ | Appearance of Sample Oil | No Change | No Change | No Change |
| Hydrolytic | Appearance  Cu | Less Glossy | No Change | No Change |
| stability Test I | of Catalyst  Fe | No Change | No Change | No Change |
|  | Al | No Change | No Change | No Change |
|  | Volume Resistivity (Ω · cm) | $3.9 \times 10^{10}$ | $1.0 \times 10^{12}$ | $4.8 \times 10^{11}$ |
|  | Total Acid Value (mg KOH/g) | 0.69 | 0.05 | 0.52 |
| FALEX Test | Amount of Journal Worn (mg) | 25 | 20 | 9 |

TABLE 3

|  |  | Comparative Example 1 | Comparative Example 2 | Compartive Example 3 | Comparative Example 4 |
|---|---|---|---|---|---|
| Base Oil (% by mass) |  | 7 (100) | 8 (100) | 9 (100) | 10 (100) |
| Additive (% by mass) |  | — | — | — | — |
| Kinematic Viscosity | 40° C. (mm$^2$/s) | 6.7 | 9.1 | 11.0 | 17.7 |
|  | 100° C. (mm$^2$/s) | 1.9 | 2.1 | 2.7 | 3.4 |
| Total Acid Value (mg KOH/g) |  | 0.00 | 0.00 | 0.00 | 0.00 |
| Miscibility |  | Miscible | Miscible | Phase Separation | Phase Separation |
| Volume Resistivity (Ω · cm) |  | $1.7 \times 10^{12}$ | $3.4 \times 10^{11}$ | $4.6 \times 10^{12}$ | $8.9 \times 10^{11}$ |
| Heat Stability/ Hydrolytic stability Test I | Appearance of Sample Oil | No Change | No Change | No Change | No Change |
|  | Appearance of Catalyst Cu | Less Glossy | Less Glossy | No Change | No Change |
|  | Fe | Blackened | Partially Blackened | No Change | No Change |
|  | Al | No Change | No Change | No Change | No Change |
|  | Volume Resistivity (Ω · cm) | $3.2 \times 10^{10}$ | $2.5 \times 10^{10}$ | $6.8 \times 10^{11}$ | $4.8 \times 10^{10}$ |
|  | Total Acid Value (mg KOH/g) | 2.33 | 1.18 | 1.36 | 0.30 |
| FALEX Test | Amount of Journal Wom (mg) | 28 | 30 | 17 | 24 |

TABLE 4

|  |  | Example 9 | Example 10 | Example 11 |
|---|---|---|---|---|
| Base Oil (% by mass) |  | 11 (100) | 12 (100) | 13 (100) |
| Additive (% by mass) |  | — | — | — |
| Kinematic Viscosity | 40° C. (mm$^2$/s) | 15.3 | 16.5 | 11.9 |
|  | 100° C. (mm$^2$/s) | 3.0 | 3.3 | 2.7 |
| Total Acid Value (mg KOH/g) |  | 0.00 | 0.00 | 0.00 |
| Miscibility |  | Miscible | Miscible | Miscible |
| Volume Resistivity (Ω · cm) |  | $9.9 \times 10^{12}$ | $9.0 \times 10^{12}$ | $1.8 \times 10^{13}$ |
| Heat Stability/ Hydrolytic stability Test I | Appearance of Sample Oil | No Change | No Change | No Change |
|  | Appearance of Catalyst Cu | No Change | No Change | No Change |
|  | Fe | No Change | No Change | No Change |
|  | Al | No Change | No Change | No Change |
|  | Volume Resistivity (Ω · cm) | $1.8 \times 10^{12}$ | $2.0 \times 10^{12}$ | $3.6 \times 10^{12}$ |
|  | Total Acid Value (mg KOH/g) | 0.45 | 0.39 | 0.69 |
| FALEX Test | Amount of Journal Wom (mg) | 15 | 14 | 19 |
| Heat Stability/ Hydrolytic stability Test II | Appearance of Sample Oil | No Change | No Change | No Change |
|  | Kinematic Viscosity 40° C. (mm$^2$/s) | 23.2 | 24.5 | 18.1 |
|  | Total Acid Value (mg KOH/g) | 1.61 | 1.38 | 1.29 |

TABLE 5

|  |  | Example 12 | Example 13 | Example 14 | Example 15 | Example 16 |
|---|---|---|---|---|---|---|
| Base Oil (% by mass) |  | 14 (100) | 15 (100) | 16 (100) | 17 (100) | 18 (100) |
| Additive (% by mass) |  | — | — | — | — | — |
| Kinematic Viscosity | 40° C. (mm$^2$/s) | 11.0 | 10.9 | 17.0 | 15.6 | 12.7 |
|  | 100° C. (mm$^2$/s) | 3.1 | 2.6 | 3.3 | 3.1 | 2.7 |
| Total Acid Value (mg KOH/g) |  | 0.00 | 0.00 | 0.00 | 0.00 | 0.00 |
| Miscibility |  | Miscible | Miscible | Miscible | Miscible | Miscible |
| Volume Resistivity (Ω · cm) |  | $6.5 \times 10^{12}$ | $7.0 \times 10^{12}$ | $8.7 \times 10^{12}$ | $4.9 \times 10^{13}$ | $2.9 \times 10^{13}$ |
| Heat Stability/ Hydrolytic stability Test I | Appearance of Sample Oil | No Change | No Change | No Change | No Change | No Change |
|  | Appearance of Catalyst Cu | No Change | No Change | No Change | No Change | No Change |
|  | Fe | No Change | No Change | No Change | No Change | No Change |
|  | Al | No Change | No Change | No Change | No Change | No Change |
|  | Volume Resistivity (Ω · cm) | $9.2 \times 10^{11}$ | $1.1 \times 10^{12}$ | $2.5 \times 10^{12}$ | $5.6 \times 10^{12}$ | $4.9 \times 10^{12}$ |
|  | Total Acid Value (mg KOH/g) | 1.09 | 0.81 | 0.31 | 0.39 | 0.29 |
| FALEX Test | Amount of Journal Wom (mg) | 22 | 21 | 18 | 17 | 23 |

TABLE 5-continued

| | | Example 12 | Example 13 | Example 14 | Example 15 | Example 16 |
|---|---|---|---|---|---|---|
| Heat Stability/ Hydrolytic stability Test II | Appearance of Sample Oil | No Change | No Change | No Change | No Change | No Change |
| | Kinematic Viscosity 40° C. (mm²/s) | 12.0 | 12.1 | 18.9 | 17.1 | 13.8 |
| | Total Acid Value (mg KOH/g) | 3.05 | 3.47 | 3.29 | 3.15 | 3.54 |

TABLE 6

| | | | Example 17 | Comparative Example 5 | Comparative Example 6 | Comparative Example 7 | Comparative Example 8 |
|---|---|---|---|---|---|---|---|
| Base Oil (% by mass) | | | 19 (100) | 20 (100) | 21 (100) | 22 (100) | 23 (100) |
| Additive (% by mass) | | | — | — | — | — | — |
| Kinematic Viscosity | 40° C. (mm²/s) | | 14.1 | 7.2 | 9.8 | 11.8 | 18.2 |
| | 100° C. (mm²/s) | | 2.9 | 2.0 | 2.2 | 2.8 | 3.4 |
| Total Acid Value (mg KOH/g) | | | 0.00 | 0.00 | 0.00 | 0.00 | 0.00 |
| Miscibility | | | Miscible | Miscible | Miscible | Phase Separation | Phase Separation |
| Volume Resistivity (Ω · cm) | | | $3.1 \times 10^{13}$ | $5.8 \times 10^{12}$ | $9.1 \times 10^{11}$ | $1.0 \times 10^{13}$ | $9.7 \times 10^{12}$ |
| Heat Stability/ Hydrolytic stability Test I | Appearance of Sample Oil | | No Change | No Change | No Change | No Change | No Change |
| | Appearance of Catalyst | Cu | Less Glossy | Less Glossy | Less Glossy | No Change | No Change |
| | | Fe | No Change | Blackened | Partially Blackened | No Change | No Change |
| | | Al | No Change | No Change | No Change | No Change | No Change |
| | Volume Resistivity (Ω · cm) | | $7.2 \times 10^{11}$ | $9.1 \times 10^{10}$ | $7.5 \times 10^{10}$ | $8.7 \times 10^{11}$ | $2.8 \times 10^{12}$ |
| | Total Acid Value (mg KOH/g) | | 0.62 | 2.15 | 1.23 | 1.59 | 0.28 |
| FALEX Test | Amount of Journal Wom (mg) | | 25 | 32 | 29 | 21 | 19 |

TABLE 7

| | | | Example 18 | Example 19 | Example 20 |
|---|---|---|---|---|---|
| Base Oil (% by mass) | | | 24 (100) | 25 (100) | 26 (100) |
| Additive (% by mass) | | | — | — | — |
| Kinematic Viscosity | 40° C. (mm²/s) | | 12.6 | 17.2 | 12.5 |
| | 100° C. (mm²/s) | | 2.7 | 3.4 | 2.8 |
| Total Acid Value (mg KOH/g) | | | 0.00 | 0.00 | 0.00 |
| Miscibility | | | Miscible | Miscible | Miscible |
| Volume Resistivity (Ω · cm) | | | $2.8 \times 10^{13}$ | $7.0 \times 10^{13}$ | $3.5 \times 10^{13}$ |
| Heat Stability/ Hydrolytic stability Test I | Appearance of Sample Oil | | No Change | No Change | No Change |
| | Appearance of Catalyst | Cu | No Change | No Change | No Change |
| | | Fe | No Change | No Change | No Change |
| | | Al | No Change | No Change | No Change |
| | Volume Resistivity (Ω · cm) | | $4.5 \times 10^{12}$ | $1.2 \times 10^{13}$ | $6.7 \times 10^{12}$ |
| | Total Acid Value (mg KOH/g) | | 0.39 | 0.41 | 0.53 |
| FALEX Test | Amount of Journal Wom (mg) | | 18 | 16 | 18 |
| Heat Stability/ Hydrolytic stability Test II | Appearance of Sample Oil | | No Change | No Change | No Change |
| | Kinematic Viscosity 40° C. (mm²/s) | | 14.0 | 18.5 | 13.9 |
| | Total Acid Value (mg KOH/g) | | 3.32 | 3.12 | 2.98 |

TABLE 8

| | | Compartive Example 9 | Comparative Example 10 | Comparative Example 11 | Comparative Example 12 | Comparative Example 13 |
|---|---|---|---|---|---|---|
| Base Oil (% by mass) | | 27 (100) | 28 (100) | 29 (100) | 30 (100) | 31 (100) |
| Additive (% by mass) | | — | — | — | — | — |
| Kinematic Viscosity | 40° C. (mm²/s) | 28.4 | 23.2 | 135.7 | 27.0 | 21.0 |
| | 100° C. (mm²/s) | 5.2 | 4.1 | 9.2 | 4.6 | 4.1 |
| Total Acid Value (mg KOH/g) | | 0.00 | 0.00 | 0.00 | 0.00 | 0.00 |
| Miscibility | | Phase Separation | Phase Separation | Phase Separation | Phase Separation | Phase Separation |
| Volume Resistivity (Ω · cm) | | $1.5 \times 10^{13}$ | $3.8 \times 10^{13}$ | $4.1 \times 10^{13}$ | $5.2 \times 10^{13}$ | $5.6 \times 10^{13}$ |
| Heat Stability/ Hydrolytic stability Test I | Appearance of Sample Oil | No Change | No Change | No Change | No Change | No Change |
| | Appearance of Catalyst Cu | No Change | No Change | No Change | No Change | No Change |
| | Fe | No Change | No Change | No Change | No Change | No Change |
| | Al | No Change | No Change | No Change | No Change | No Change |
| | Volume Resistivity (Ω · cm) | $5.3 \times 10^{12}$ | $2.0 \times 10^{12}$ | $4.9 \times 10^{12}$ | $3.1 \times 10^{12}$ | $1.8 \times 10^{12}$ |
| | Total Acid Value (mg KOH/g) | 1.05 | 0.48 | 0.39 | 0.56 | 0.98 |
| FALEX Test | Amount of Journal Wom (mg) | 16 | 22 | 28 | 20 | 19 |

It is shown clearly by the results stated in Tables 1 to 8 that the sample oils in Examples 1 to 20 of the refrigerating machine oil composition according to the present invention have the excellent and well-balanced performances including kinematic viscosity, refrigerant miscibility, electric insulating ability, hydrolytic stability, heat stability and lubricity when it is used together with an HFC refrigerant.

It is also clarified by the results shown in Table 2 that more excellent heat stability /hydrolytic stability can be obtained when a glycidyl ester epoxy compound is incorporated as an additive; and more excellent lubricity can be obtained when a phosphorus compound is used as an additive.

From the invention thus describe, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A refrigerating machine oil composition comprising a refrigerant selected from the group consisting of hydrofluorocarbon refrigerants, fluorine-containing ether refrigerants, fluorine-free ether refrigerants, natural refrigerants and mixtures thereof and an alicylclic dicarboxylic acid ester compound having an alicylclic ring and two ester groups represented by formula (1) bonded to adjacent carbon atoms of the alicyclic ring:

—COOR¹      (1)

wherein $R^1$ represents an alkyl group having 1–18 carbon atoms, said alicyclic dicarboxylic acid ester compound being obtained by using an alcohol component comprising:
 (a) at least one alcohol selected from a group consisting of fatty alcohols each having 1 to 5 carbon atoms; and
 (b) at least one alcohol selected from a group consisting of fatty
 wherein the mole ratio between said fatty alcohol (a) and fatty alcohol (b) employed as said alcohol component ranges from 1:99 to 99:1.

2. A refrigerating machine oil composition according to claim 1, wherein said fatty alcohol (a) is at least an alcohol selected from a group consisting of n-butanolandn-pentanol.

3. A refrigerating machine oil composition according to claim 1, wherein said fatty alcohol (a) is at least an alcohol selected from a group consisting of iso-butanol and iso-pentanol.

4. A refrigerating machine oil composition according to claim 1, wherein said fatty alcohol (b) is at least an alcohol selected from a group consisting of fatty alcohols each having 6 to 12 carbon atoms.

5. A refrigerating machine oil composition according to claim 1, wherein said fatty alcohol (b) is at least an alcohol selected from a group consisting of fatty alcohols each having 7 to 9 carbon atoms.

6. A refrigerating machine oil composition according to claim 1, further comprising an epoxy compound.

7. A refrigerating machine oil composition according to claim 6, wherein said epoxy compound is at least one compound selected from a group consisting of phenylglycidyl ether epoxy compounds, glycidyl ester epoxy compounds, alicyclic epoxy compounds and epoxidized aliphatic acid monoesters.

8. A refrigerating machine oil composition according to claim 6, wherein said epoxy compound is at least one compound selected from a group consisting of glycidyl ester epoxy compounds and alicyclic epoxy compounds.

9. A refrigerating machine oil composition according to claim 7, further comprising a phosphorus compound.

10. A fluid composition for refrigerating machines comprising the refrigerating machine oil composition according to claim 1 and a chlorine-free fluorocarbon.

11. A refrigerating machine oil composition according to claim 1, wherein said alicyclic dicarboxylic acid ester compound is an alicyclic diarboxylic acid ester having two ester groups represented by formula (1), wherein one ester group is derived from the fatty alcohol (a) and the other ester group is derived from the fatty alcohol (b).

12. A refrigerating machine oil composition according to claim 1, wherein said alicyclic dicarboxylic acid ester compound is a mixture of an alicyclic dicarboxylic acid ester having two ester groups represented by formula (1) which are derived from said fatty alcohol (a) and an alicyclic dicarboxylic acid ester having two ester groups represented by formula (1) which are derived from said fatty alcohol (b).

13. A refrigerating machine oil composition according to claim 1, wherein said alicyclic dicarboxylic acid ester compound is a mixture of:

(a) an alicyclic dicarboxylic acid ester having two ester groups represented by formula (1), wherein one ester group is derived from said fatty alcohol (a) and the other ester group is derived from said fatty alcohol (b); and (b) a mixture of an alicyclic dicarboxylic acid ester having two ester groups represented by formula (1) which are derived from said fatty alcohol (a) and an alicyclic dicarboxylic acid ester having two ester groups represented by formula (1) which are derived from said fatty alcohol (b).

* * * * *

UNITED STATES PATENT AND TRADEMARK OFFICE
CERTIFICATE OF CORRECTION

PATENT NO. : 6,355,186 B1
DATED : March 12, 2002
INVENTOR(S) : Yuji Shimomura et al.

It is certified that error appears in the above-identified patent and that said Letters Patent is hereby corrected as shown below:

<u>Title page,</u>
Item [57], ABSTRACT,
Line 2, "alicylic" should read -- alicyclic --.

<u>Column 23,</u>
Line 60, "of fatty" should read -- of fatty alcohols each having 6 to 18 carbon atoms; --.
Line 67, "n-butanolandn-pentanol" should read -- n-butanol and n-pentanol --.

<u>Column 24,</u>
Line 49, "claim 7" should read -- claim 1 --.
Line 56, "diarboxylic" should read -- dicarboxylic --.

<u>Column 26,</u>
Line 7, insert claim 14 as follows:

--      14. A refrigerating machine oil composition according to claim 13, wherein a content of said alicyclic dicarboxylic acid ester (a) is not less than 5% by mass of the total amount of said alicyclic dicarboxylic acid ester (a) and said mixture (b). --

Signed and Sealed this

Twentieth Day of August, 2002

*Attest:*

*Attesting Officer*

JAMES E. ROGAN
*Director of the United States Patent and Trademark Office*